United States Patent [19]
Gerhard

[11] Patent Number: 5,249,897
[45] Date of Patent: Oct. 5, 1993

[54] EXPANDING PLUG

[75] Inventor: Anton Gerhard, Nürnberg, Fed. Rep. of Germany

[73] Assignee: "Toge-Dubel" A. Gerhard GmbH, Nuremberg, Fed. Rep. of Germany

[21] Appl. No.: 3,655

[22] Filed: Jan. 13, 1993

[30] Foreign Application Priority Data

Jan. 14, 1992 [DE] Fed. Rep. of Germany ....... 4200785

[51] Int. Cl.⁵ .............................................. F16B 13/06
[52] U.S. Cl. ........................................ 411/50; 411/55
[58] Field of Search ............... 411/50, 44, 45, 53, 411/55, 46, 49, 61, 48, 51, 27, 28

[56] References Cited

U.S. PATENT DOCUMENTS

| | | | |
|---|---|---|---|
| 1,365,945 | 1/1921 | Ogden | 411/28 |
| 2,075,952 | 4/1937 | McIntosh | 411/53 |
| 4,481,702 | 11/1984 | Mitchell | 411/53 X |
| 4,602,902 | 7/1986 | Herb | 411/60 X |
| 5,112,174 | 5/1992 | Gerhard | 411/53 |

FOREIGN PATENT DOCUMENTS

| | | |
|---|---|---|
| 0006977 | 4/1979 | European Pat. Off. |
| 3444934 | 2/1988 | Fed. Rep. of Germany |
| 4010082 | 10/1991 | Fed. Rep. of Germany |

Primary Examiner—Rodney M. Lindsey
Attorney, Agent, or Firm—Browdy and Neimark

[57] ABSTRACT

An expanding plug comprises in usual manner an expanding sleeve, an expanding screw and an expanding cone which serves to expand the expanding sleeve and which can be pulled into the expanding sleeve by means of the expanding screw. So as to reduce the material need for the expanding cone and the manufacturing expenditure, the expanding cone is bent from metal sheet. Its edge surfaces of its wall limiting a joint gap extend in the direction to the central longitudinal axis and tangentially to the latter bear unconnected and flush against each other. The expanding cone formed with relatively thick walls comprises hardened surface regions and an unhardened basic region.

12 Claims, 1 Drawing Sheet

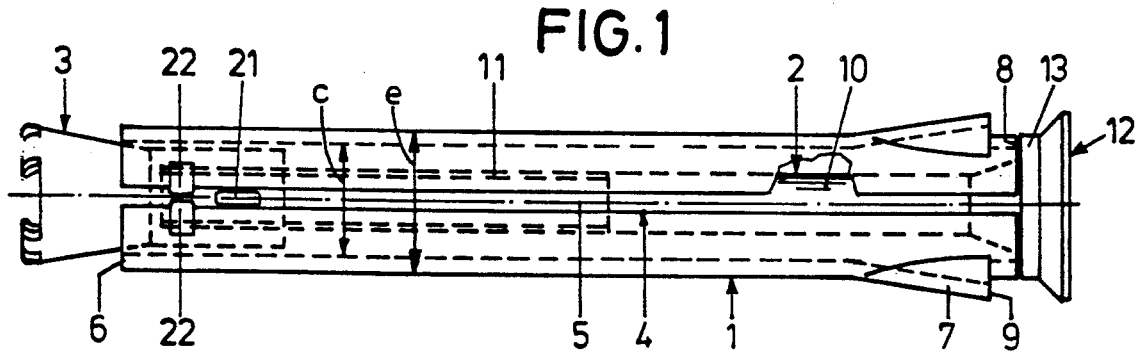
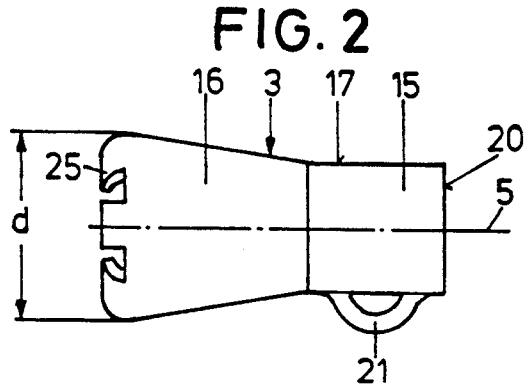
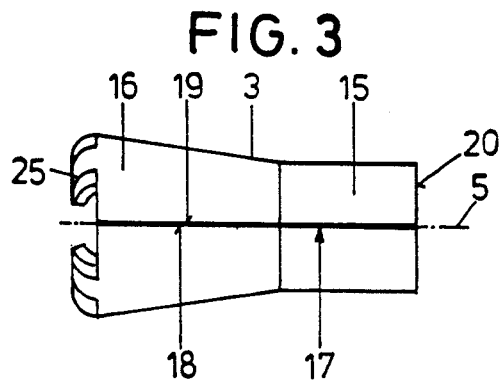
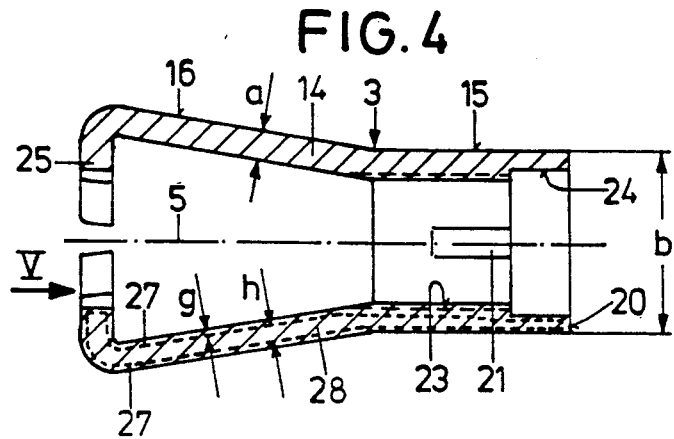
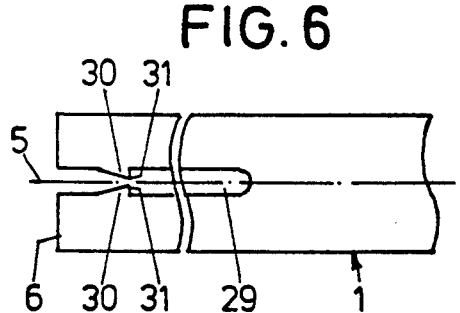
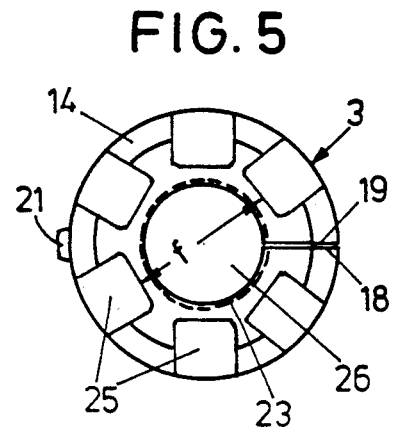

EXPANDING PLUG

BACKGROUND OF THE INVENTION

1. Field of the Invention

The invention relates to an expanding plug comprising an expanding sleeve provided at least over a part of its length with at least one slot, an expanding screw arranged in the expanding sleeve concentrically to a common central longitudinal axis and supporting with a head on a rim of the expanding sleeve against the latter, and an expanding cone held in an untwistable manner with respect to the expanding sleeve and axially displaceable in the latter on a plug-in end of the expanding sleeve located opposite the rim, which expanding cone comprises an internal thread for taking up an external thread of the expanding screw and an expanding section for expanding the region of the expanding sleeve associated to the plug-in end when pulling this expanding section into the expanding sleeve by means of the expanding screw, which is bent from steel sheet and which comprises edge surfaces of its wall limiting a joint gap, which edge surfaces extend in the direction of the central longitudinal axis and tangentially to the latter bear against each other.

2. Background Art

In an expanding plug of this type known from U.S. Pat. No. 5,112,174 the expanding cone is bent from metal sheet. The edges of its wall limiting a joint gap are positively connected with each other by means of a dovetailed locking in the direction of the central longitudinal axis and tangentially to the latter. This embodiment features the principal advantage that the expanding cone is of comparably little volume compared with the usual massive expanding cones of zinc die casting. This means that it is of low weight. Steel is considerably cheaper than zinc, so that it is cost-effective. Furthermore, the solidity of steel is considerably higher than that of zinc. The manufacturing of the positive locking, however, is combined with some manufacturing expenditure.

SUMMARY OF THE INVENTION

It is the object of the invention to further improve an expanding plug of the generic type in such a manner that the expanding cone can be manufactured in a particularly simple manner.

This object is attained according to the invention in case of an expanding plug of the generic type by the expanding cone being provided with hardened surface regions extending over its entire surface and with an unhardened basic region between the surface regions. Due to the fact that the expanding cone made of steel sheet is subject to surface hardening, i.e. as a rule a case hardening, in which a relatively soft unhardened basic region is maintained, the expanding cone is dimensionally very stable on the one hand, but not brittle on the other hand. This results in that the edge surfaces of its wall may bear unconnected and flush against each other, without there being the risk of the edge surfaces slipping against each other when pulling the expanding cone into the expanding sleeve. This applies in particular to the further embodiment according to which the edge surfaces extend linearly in the direction of the central longitudinal axis. In order to obtain on the one hand hardened surface regions and on the other hand a sufficiently thick unhardened basic region, it is expedient, when the wall of the expanding cone is comparatively thick. A thickness of the hardened surface regions of at least 0.1 mm on the one hand and a thickness of the unhardened basic region of at least 0.4 mm on the other hand can be easily achieved.

Further features, advantages and details of the invention will become apparent from the ensuring description of one example of embodiment of the invention taken in conjunction with the drawings.

BRIEF DESCRIPTION OF THE DRAWINGS

FIG. 1 shows a longitudinal top view of an expanding plug comprising an expanding sleeve, an expanding screw and an expanding cone, FIG. 2 shows a longitudinal top view of the expanding cone of the expanding plug on a larger scale, FIG. 3 shows a longitudinal top view of the expanding cone in an illustration rotated by 90° compared with FIG. 2, FIG. 4 shows a longitudinal section of the expanding cone on an extremely enlarged scale, FIG. 5 shows a front view of the expanding cone according to the arrow V in FIG. 4 and FIG. 6 shows a part view of the expanding sleeve in a rotated illustration compared with FIG. 1.

DESCRIPTION OF THE PREFERRED EMBODIMENTS

The expanding plug shown in FIG. 1 comprises three parts, namely an expanding sleeve 1, an expanding screw 2 and an expanding cone 3. The expanding sleeve 1 and the expanding screw 2 are of usual design.

The expanding sleeve 1 is cylindrical and bent from metal sheet. It has a slot 4 extending over the full length of the sleeve 1 and running parallel to the central longitudinal axis 5. Furthermore, it has one or several additional slots not shown in FIG. 1 at least in the vicinity of its plug-in end 6, i.e. where the expanding cone 3 is located. One or several slots may further be provided in the vicinity of the end opposite the plug-in end 6. Several projections 7 formed out of the expanding sleeve are situated there, too, and may serve to anchor the expanding sleeve 1 in brickwork, concrete or the like, or their front surfaces facing the adjacent rim 8 of the sleeve 1 serve as bearing surfaces 9 for objects to be secured to brickwork, concrete or the like, such as metal frames or the like, in particular window frames or door frames.

The expanding screw 2 has a cylindrical bolt 10 provided at least over a part of its length with an external thread 11 to be screwed into the expanding cone 3. The screw 2 further has a head 12 which is provided with a ring collar 13 facing the bolt 10 and bearing against the rim 8 of the sleeve 1, so that a precisely located bearing of the head 12 of the screw 2 against the sleeve 1 is achieved. When the expanding screw 2 is tightened the expanding cone is thus pulled into the plug-in end 6 of the sleeve 1 and expands the latter. To the extent the expanding plug has been described so far, it is generally known and accepted in practice.

The expanding cone 3 is bent from steel sheet; it has a wall 14 of which the thickness a is approximately the same all over and amounts to at least 1.0 mm.

The cone 3 has a cylindrical section 15, of which the outer diameter d is a little smaller than the inner diameter c of the expanding sleeve 1. The difference between these two diameters c and b is to amount to one to a few tenths of a millimeter at maximum, so as to allow for an introduction of this cylindrical section 15 when the cone 3 is mounted in the sleeve 1 from the plug-in end. There should be no unnecessary clearance. The cylindrical section 15 is followed by a cone-shaped, i.e. frusto-conical section 16, of which the outer diameter widens starting from the outer diameter b of the cylindrical section 15 to an outer diameter d, which approximately equals the outer diameter e of the sleeve 1, but is not larger than it, so that the expanding cone 3 does not radially protrude from the sleeve 1 when the latter is not expanded. The frusto-conical section 16 thus is an expanding section of the expanding cone 3. Since the expanding cone 3 is bent from metal sheet, is has a joint gap 17 limited or formed, respectively, by two edge surfaces 18, 19 of the wall 14. Adjacent to the free end 20 of the cylindrical section 15—diametrically to the joint gap 17—a wall section is bent outwards like eyelets from the wall 14 and radially to the axis 5, whereby an abutment 21 is formed. When the cone 3 is mounted in the sleeve 1, this abutment 21 is introduced into the slot 4 or into one of the other slots mentioned and slid over at least one projection 22 produced by local crimping from the material of the sleeve 1 and extending into the slot 4. When the cone 3 is mounted, but the sleeve has not yet been expanded, this projection 22 is located—as shown in FIG. 1—on the side of the at least one projection 22 facing away from the plug-in end 6, so that the cone 3 is held in the sleeve 1 safe from being lost, even if it is not held by the screw 2 in the sleeve 1. The cone 3 is guarded against sliding into the sleeve 1 by its frusto-conical section 16. Furthermore, a safety device to prevent twisting of the expanding cone 3 relative to the expanding sleeve 1 is created by the abutment 21 slidable in the slot 4, since only if any such twisting relative to each other is excluded, the expanding cone 3 can be pulled into the sleeve 1 when the screw 2 is twisted relative to the sleeve 1.

In the cylindrical section 15 an internal thread 23 is formed to take up the external thread 11 of the bolt 10, whereby in the vicinity of the free end 20 an undercut 24 is formed at the inner side of the wall 14, which serves for facilitating introduction of the bolt 10 into the cylindrical section 15. The internal thread 23 ends in the frusto-conical section 16 at the transition of the cylindrical section 15.

At the end of the frusto-conical section 16 located outside the expanding sleeve 1 tongues 25 are provided which are radially bent inwards, i.e. towards the axis 5, which limit a front end opening 26 of the cone 3, the diameter f of which corresponds approximately to the outer diameter of the external thread 11 of the screw 2, so that, when the cone 3 is pulled into the sleeve 1, the cone 3 is once again and additionally centered relative to the bolt 10 of the screw 2, when the latter passes through the opening 26.

As can be seen from FIGS. 3 and 5, the edge surfaces 18, 19 of the wall 14 of the cone 3 bear linearly against each other while forming the joint gap 17, i.e. they extend radially to the axis 5. This results in that forces extending in the circumferential direction of the cone 3 in the wall 14 can alternately be imparted from one edge surface 18 or 19 to the other edge surface 19 or 18.

As already described the expanding cone 3 consist of steel sheet, whereby a relatively soft steel is used, which has good punching qualities and which can be well cold-worked, as forming of the cone 3 is carried out be bending while it is cold. The cone 3 is hardened by case hardening in the vicinity of its entire surface, resulting in hardened surface regions 27, of which the thickness g amounts to approximately 0.1 mm. Between these hardened surface regions 27 an unhardened basic region 28 remains, which is charged with the task not to render too brittle the cone 3 as a whole. The hardened surface regions 27 and the unhardened basic region 28 located between them are outlined in FIG. 4 on the bottom by dashed lines. By an unhardened, i.e. relatively soft and still workable basic region 28 on the one hand and the hardened surface regions 27 surrounding the latter on the other hand, the cone 3 as a whole obtains such a solidity, that in spite of the absence of any connection of the edge surfaces 18, 19 with each other it remains dimensionally stable and cannot be pressed in, when the cone 3 is pulled into the expanding sleeve 1. As the webs of the internal thread 23 are also hardened, the internal thread 23 can be stressed in particularly high manner. By means of the fact that on the other hand the thickness a of the wall 14 is at least 1.0 mm, there is still a sufficiently thick unhardened basic region 28 also in the vicinity of the internal thread 23. This unhardened basic region 28 as a whole should have a thickness h of 0.4 to 0.5 mm. This can be attained without any problems also in the vicinity of the internal thread 23, as the thread is produced by forming and not by cutting, i.e., when forming the inner side of the wall 14 for producing the internal thread 23, material is formed in the direction towards the axis 5.

The surface hardness of the hardened surface regions 27 as a rule is larger 65 Rockwell.

In FIG. 6 one of the additional slots 29 mentioned above and not shown in FIG. 1 can be seen, which is arranged offset to the slot 4 in the circumferential direction and extends—starting from the plug-in end 6—parallel to the axis 5 only over a part of the length of the expanding sleeve 1. This slot 29 is produced by punching, when the sleeve 1 is manufactured. It comprises two projections 30 corresponding to each other, which correspond in their function to the projections 22. As they are produced when the slot 29 is punched, they can be provided with tips 31 directed towards each other, so that the eyelet-shaped abutment 21 of the expanding cone 3 can be held there, when the plug is mounted, by way of the tips 31 engaging with the eyelet-like abutment 21.

By means of this the cone 3 is not only held safe from being lost at the sleeve 1; it is also held axially undisplaceably relative to the sleeve 1 for introducing the expanding screw 2. In so far these projections 30 serve as improved mounting aids.

The main field of application of the described expanding cones 3 is in case of expanding plugs, the expanding sleeve 1 of which has an outer diameter e of 10 or also 12 mm.

What is claimed is:

1. An expanding plug comprising:
    an expanding sleeve (1) which is provided at least over a part of its length with at least one slot (4, 29), and which has a central longitudinal axis (5) and a rim (8) at a first end and a plug-in end (6) at a second end;
    an expanding screw (2) which has a head (12) at a first end and an external thread (11) at a second end and which is arranged in the expanding sleeve (1) concentrically to said central longitudinal axis (5) and which is supported with said head (12) on said rim (8) of the expanding sleeve (1); and an expanding cone (3) which is arranged in the plug-in end (6) of the expanding sleeve (1), and which is provided with an internal thread (23) for taking up said external thread (11) of the expanding screw (2) and with an expanding section (16) for expanding the plug-in end (6) of the expanding sleeve (1) when being pulled into the expanding sleeve (1) by means of the expanding screw (2) and which expanding cone (3) consists of bent steel sheet and comprises edge surfaces (18, 19) limiting a joint gap (17), which edge surfaces (18, 19) extend in the direction of the central longitudinal axis (5) and bear against each other in a peripheral direction of the cone, wherein the expanding cone (3) is provided with hardened surface regions (27) extending over its entire surface and with an unhardened basic region (28) between the surface regions (27).

2. An expanding plug according to claim 1, wherein the edge surfaces (18, 19) bear unconnected and flush against each other.

3. An expanding plug according to claim 1, wherein the edge surfaces (18, 19) extend linearly in the direction of the central longitudinal axis (5).

4. An expanding plug according to claim 1, wherein the edge surfaces (18, 19) extend radially to the central longitudinal axis (5).

5. An expanding plug according to claim 1, wherein the thickness (a) of the wall (14) of the expanding cone (3) is at least 1.0 mm.

6. An expanding plug according to claim 1, wherein the thickness (a) of the wall (14) of the expanding cone (3) is 1.0 to 1.3 mm.

7. An expanding plug according to claim 1, wherein the thickness (g) of the hardened surface regions (27) is at least 0.1 mm.

8. An expanding plug according to claim 1, wherein the thickness (h) of the unhardened basic region is at least 0.4 mm.

9. An expanding plug according to claim 1, wherein the expanding cone (3) comprises a cylindrical section (15) following the expanding section (frusto-conical section 16), which is provided with an abutment (21) formed out of the wall (14) and arranged diametrically to the joint gap (17).

10. An expanding plug according to claim 9, wherein the abutment (21) is formed in the shape of an eyelet.

11. An expanding plug according to claim 9, wherein the abutment (21) is arranged at at least one projection (22, 30) projecting into a slot (4, 29) and formed at the expanding sleeve (1) to form a safety device to prevent loss between the expanding sleeve (1) and the expanding cone (3).

12. An expanding plug according to claim 11, wherein the abutment (21) is formed in the shape of an eyelet and wherein the at least one projection (30) is provided with a tip (31) projecting into the eyelet-shaped abutment (21).

* * * * *